(12) United States Patent
Hanano

(10) Patent No.: US 11,090,871 B2
(45) Date of Patent: Aug. 17, 2021

(54) BODY PHANTOM, APPARATUS FOR PRODUCING LAYERED RESIN STRUCTURE, AND METHOD FOR PRODUCING LAYERED RESIN STRUCTURE

(71) Applicant: OLYMPUS CORPORATION, Hachioji (JP)

(72) Inventor: Kazunari Hanano, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 82 days.

(21) Appl. No.: 16/212,452

(22) Filed: Dec. 6, 2018

(65) Prior Publication Data

US 2019/0105846 A1  Apr. 11, 2019

Related U.S. Application Data

(63) Continuation of application No. PCT/JP2016/068159, filed on Jun. 17, 2016.

(51) Int. Cl.
*B29C 64/393* (2017.01)
*B29C 64/106* (2017.01)
*B33Y 10/00* (2015.01)
*B33Y 50/02* (2015.01)
*B33Y 70/00* (2020.01)
(Continued)

(52) U.S. Cl.
CPC .......... *B29C 64/393* (2017.08); *B29C 64/106* (2017.08); *B29C 64/112* (2017.08); *B33Y 10/00* (2014.12); *B33Y 50/02* (2014.12); *B33Y 70/00* (2014.12); *B29C 64/194* (2017.08); *B29K 2995/0031* (2013.01); *B33Y 30/00* (2014.12); *B33Y 80/00* (2014.12)

(58) Field of Classification Search
None
See application file for complete search history.

(56) References Cited

U.S. PATENT DOCUMENTS 9,183,764 B2    11/2015  Sugimoto et al.
2006/0056580 A1*  3/2006  Frangioni ............ G01N 23/223
                                                                378/18

(Continued)

FOREIGN PATENT DOCUMENTS

JP    2000089663 A    3/2000
JP    2001008941 A    1/2001
(Continued)

OTHER PUBLICATIONS

English Language Translation of International Preliminary Report on Patentability (IPRP) and Written Opinion dated Dec. 27, 2018 issued in International Application No. PCT/JP2016/068159.
(Continued)

*Primary Examiner* — Paul M. West
*Assistant Examiner* — Mark A Shabman
(74) *Attorney, Agent, or Firm* — Holtz, Holtz & Volek PC

(57) ABSTRACT

A body phantom according to an embodiment includes a layered resin structure formed by combining a first material having a first refractive index and a second material having a second refractive index based on three-dimensional data that indicates an optical characteristic of a living body, wherein a mixing ratio of the second material to the first material to form the layered resin structure is a value corresponding to the optical characteristic.

8 Claims, 5 Drawing Sheets

(51) Int. Cl.
*B29C 64/112* (2017.01)
*B33Y 80/00* (2015.01)
*B33Y 30/00* (2015.01)
*B29C 64/194* (2017.01)

(56) References Cited

U.S. PATENT DOCUMENTS

2006/0118758 A1* 6/2006 Wang ............... A61L 31/18
                                                            252/62.51 R
2007/0238966 A1* 10/2007 Sun ............... A61B 5/4312
                                                            600/407
2014/0017651 A1* 1/2014 Sugimoto ........... G09B 23/30
                                                           434/272

FOREIGN PATENT DOCUMENTS

| JP | 2009083326 A | 4/2009 |
| JP | 2013043409 A | 3/2013 |
| JP | 2016001267 A | 1/2016 |
| WO | 2012132463 A1 | 10/2012 |

OTHER PUBLICATIONS

International Search Report (ISR) dated Aug. 16, 2016 issued in International Application No. PCT/JP2016/068159.
Written Opinion dated Aug. 16, 2016 issued in International Application No. PCT/JP2016/068159.

* cited by examiner

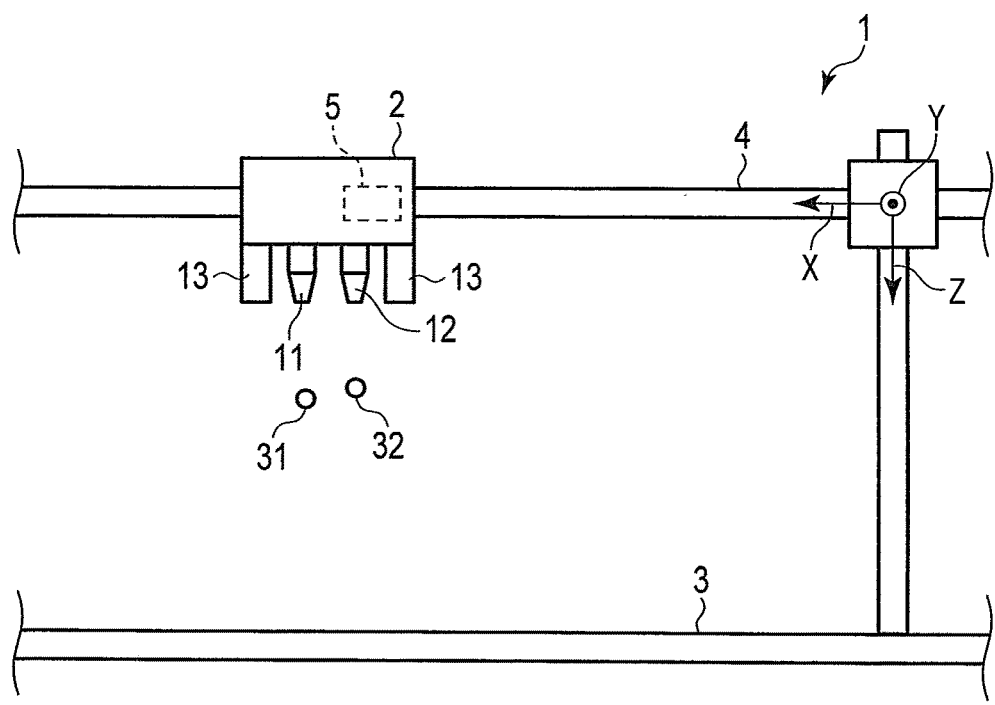
F I G. 1
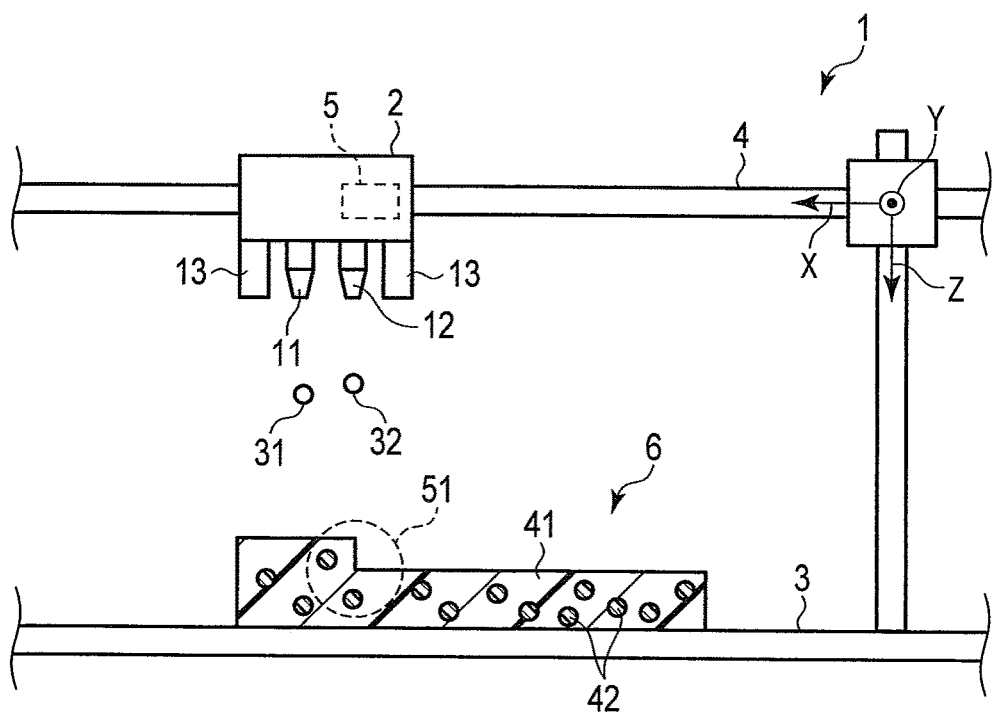
F I G. 2

BODY PHANTOM, APPARATUS FOR PRODUCING LAYERED RESIN STRUCTURE, AND METHOD FOR PRODUCING LAYERED RESIN STRUCTURE

CROSS-REFERENCE TO RELATED APPLICATIONS

This application is a Continuation Application of PCT Application No. PCT/JP2016/068159, filed Jun. 17, 2016, the entire contents of all of which are incorporated herein by reference.

FIELD

The present invention relates to a body phantom, an apparatus for producing a layered resin structure, and a method of producing a layered resin structure.

BACKGROUND OF THE INVENTION

A so-called 3D printer has been put to practical use. The 3D printer produces a three-dimensional object (layered resin structure) by discharging, from a nozzle, a resin material curable when irradiated with ultraviolet light or the like, and irradiating the discharged droplets with ultraviolet light to cure the resin material. For example, Jpn. Pat. Appln. KOKAI Publication No. 2013-43409 discloses the modeling apparatus as a 3D printer.

A body phantom (medical phantom) that simulates characteristics of the living body is used as a subject in the medical field. Since a 3D printer can produce a layered resin structure by combining multiple types of materials having different characteristics, the 3D printer is considered useful for production of a body phantom which accurately simulates a shape, function and characteristics of the living body, delivers cost reduction in production of the body phantom, and brings improvement in the immediacy of production of the body phantom.

SUMMARY

An object of the present invention is to provide a body phantom which is produced by combining plural types of materials having different characteristics, as well as an apparatus for producing a layered resin structure, and a method of producing a layered resin structure.

A body phantom according to one embodiment includes a layered resin structure formed by combining a first material having a first refractive index and a second material having a second refractive index on the basis of three-dimensional data indicating optical characteristics of a living body, and a ratio of the second material to the first material to form the layered resin structure is a value corresponding to the optical characteristics.

According to the present invention, it is possible to provide a body phantom which is produced by combining plural types of materials having different characteristics, as well as an apparatus for producing a layered resin structure, and a method of producing a layered resin structure.

BRIEF DESCRIPTION OF THE DRAWINGS

FIG. 1 is an explanatory diagram to explain an example of a 3D printer 1 according to the first embodiment;

FIG. 2 is an explanatory diagram to explain an example of a step in the formation of a layered resin structure by the 3D printer according to the first embodiment;

DETAILED DESCRIPTION

Figure 3:
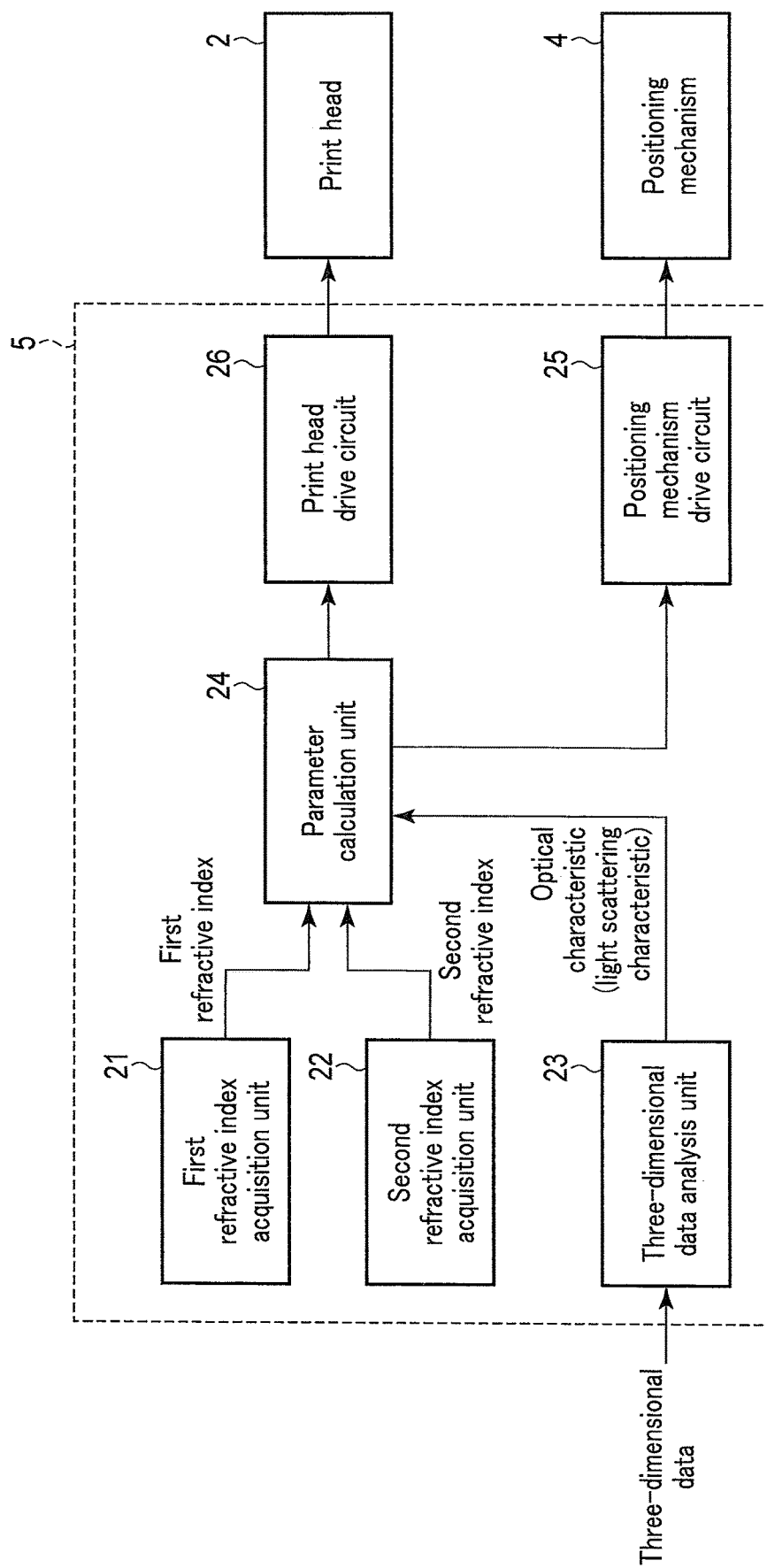
FIG. 3 is a block diagram showing, as blocks, functions of a controller of the 3D printer according to the first embodiment.

Hereinafter, a detailed explanation will be given of a body phantom, an apparatus for producing a layered resin structure, and a method of producing the layered resin structure.

In the present embodiment, a body phantom that simulates characteristics of a living body as a subject is formed by a so-called 3D printer that produces a three-dimensional object based on three-dimensional data. As an example of a 3D printer, an inkjet type 3D printer that discharges a liquid resin curable by light (for example, ultraviolet light) and cures the resin with ultraviolet light to form a three-dimensional object will be described as an example. However, the 3D printer is not limited to the ink jet system. The modeling method of the 3D printer may adopt a method of solidifying powders, a method of curing in liquid, or the like.

In the present embodiment, three-dimensional data indicates optical characteristics (for example, light scattering characteristics) of each of a plurality of regions arranged in a three-dimensional space having a width direction, a depth direction, and a height direction. For example, the three-dimensional data indicates optical parameters such as light scattering characteristics of each region determined by X, Y and Z directions when a width direction is represented as an X direction, a depth direction is represented as a Y direction, and a height direction is represented as a Z direction. The light scattering characteristics indicate how light propagates in the living body as a medium when the living body is irradiated with light. For example, the three-dimensional data is generated based on a measurement result of how light propagates in the living body when the living body is irradiated with light. The three-dimensional data may be data such as, for example, 3D-CAD or 3D-CG in which optical characteristics are defined.

First Embodiment

FIG. 1 is an explanatory diagram to explain an example of a 3D printer 1 according to the first embodiment. The 3D printer 1 is an apparatus for producing a layered resin structure 6. The 3D printer 1 includes a print head 2, a stage 3, a positioning mechanism 4, and a controller 5.

The print head 2 discharges liquid resin as droplets. The print head 2 includes a pressure chamber filled with a resin material for forming a resin structure which is a part of the three-dimensional object. For example, the print head 2 includes a first pressure chamber filled with a first material having a first refractive index, and a second pressure chamber filled with a second material having a second refractive index. The print head 2 changes a pressure in each pressure chamber in accordance with a control of the controller 5, thereby discharging a resin material filled in the chamber, as droplets, from a nozzle communicating with the pressure chamber.

For example, the print head 2 includes a first nozzle 11, a second nozzle 12, and an ultraviolet-rays lamp 13. The first nozzle 11 communicates with the first pressure chamber. The second nozzle 12 communicates with the second pressure chamber. The print head 2 changes the pressure in the first pressure chamber in accordance with a control of the controller 5, thereby discharging the first material filled in the first chamber from the nozzle as droplets 31. The print head 2 changes the pressure in the second pressure chamber in accordance with a control of the controller 5, thereby discharging the second material filled in the second pressure chamber from the nozzle as droplets 32.

The ultraviolet-rays lamp 13 irradiates droplets 31 and 32 discharged from the first nozzle 11 and the second nozzle 12 with ultraviolet light to cure the droplets, thereby forming a resin structure. The ultraviolet-rays lamp 13 may be configured to output ultraviolet light when droplets 31 or 32 are discharged from the first nozzle 11 or the second nozzle 12, or may be configured to constantly output ultraviolet light. The layout of the ultraviolet-rays lamp 13 in the print head 2 is determined so that the droplets 31 and 32 discharged from the first nozzle 11 and the second nozzle 12 are sufficiently irradiated with ultraviolet light.

The stage 3 is a member that holds droplets discharged from the nozzle of the print head 2. The stage 3 includes a molding surface formed uniformly.

The positioning mechanism 4 determines a landing position of droplets discharged from the nozzle of the print head 2 by moving the print head 2 in accordance with the control of the controller 5. For example, the positioning mechanism 4 adjusts a landing position of droplets within a surface parallel to the molding surface of the stage 3 by moving the print head 2 in the first direction (corresponding to the X direction) parallel to the molding surface of the stage 3, and the second direction (corresponding to the Y direction) parallel to the molding surface of the stage 3 and orthogonal to the first direction. The positioning mechanism 4 adjusts a distance between the molding surface of the stage 3 and the print head 2 by moving the print head 2 in the third direction (corresponding to the Z direction) orthogonal to the molding surface of the stage 3.

The controller 5 controls the operation of each unit of the 3D printer 1. For example, the controller 5 is configured to communicate with the print head 2 and the positioning mechanism 4, and controls operations of the print head 2 and the positioning mechanism 4. In the example of FIG. 1, the controller 5 is provided integrally with the print head 2, but may be provided at any location on the condition that it can communicate with the print head 2 and the positioning mechanism 4.

The controller 5 acquires three-dimensional data, and information indicating a first refractive index which is the refractive index of the first material and a second refractive index which is the refractive index of the second material. The controller 5 discharges droplets from the print head 2 while moving the print head 2 via the positioning mechanism 4 in accordance with the three-dimensional data acquired. For example, the controller 5 determines a ratio of the second material to the first material based on the light scattering characteristic as the optical characteristic indicated by the three-dimensional data, the first refractive index, and the second refractive index, and causes the print head 2 to discharge the first material and the second material in the ratio determined, thereby forming a body phantom.

FIG. 2 is an explanatory diagram to explain an example of a step in the formation of a layered resin structure 6 by the 3D printer 1. Note that FIG. 2 illustrates the cross section of the layered resin structure 6 in the process of being formed.

The 3D printer 1 with the aforementioned configuration forms layers of the resin structure by moving the print head 2 in the X direction and the Y direction via the positioning mechanism 4 based on the three-dimensional data while discharging droplets from the print head 2 to the stage 3. Furthermore, the 3D printer 1 forms layers of the resin structure while moving the print head 2 in the Z direction via the positioning mechanism 4 based on the three-dimensional data, thereby forming the layered resin structure 6 as a body phantom.

In order to form a resin structure in a position apart in the Z direction from the molding surface of the stage 3, a supporting member to support droplets is required. The supporting member may be a resin structure one layer below, or may be any object placed on the molding surface of the stage 3.

The layered resin structure 6 includes a base portion 41 and granular portions 42. The base portion 41 is a resin structure formed from the first material. The granular portion 42 is a resin structure formed in a granular shape from the second material. The granular portions 42 are disposed in a dispersed manner (in a non-periodical manner) in the base portion 41, so that the mixing ratio of the second material to the first material is a value corresponding to the light scattering characteristic indicated by the three-dimensional data. That is, the layered resin structure 6 is a resin structure formed by combining the first material having the first refractive index and the second material having the second refractive index based on the three-dimensional data indicating the light scattering characteristics of the living body.

FIG. 3 is a block diagram showing, as blocks, functions of the controller 5. The controller 5 includes a first refractive index acquisition unit 21, a second refractive index acquisition unit 22, a three-dimensional data analysis unit 23, a parameter calculation unit 24, a positioning mechanism drive circuit 25, and a print head drive circuit 26.

The first refractive index acquisition unit 21 acquires the first refractive index which is the refractive index of the first material. The first refractive index acquisition unit 21 may be configured to acquire the first refractive index by acquiring information transmitted from an external device, or may be configured to have an input unit capable of manually inputting the first refractive index. The first refractive index acquisition unit 21 supplies the acquired first refractive index to the parameter calculation unit 24.

The second refractive index acquisition unit 22 acquires the second refractive index which is the refractive index of the second material. The second refractive index acquisition unit 22 may be configured to acquire the second refractive index by acquiring information transmitted from an external device, or may be configured to have an input unit capable of manually inputting the second refractive index. The second refractive index acquisition unit 22 supplies the acquired second refractive index to the parameter calculation unit 24.

The three-dimensional data analysis unit 23 acquires three-dimensional data, and analyzes the acquired three-dimensional data to recognize the light scattering characteristic of each region indicated by the three-dimensional data.

For example, the three-dimensional data analysis unit 23 sets a modeling range in which small regions with the resolution of the 3D printer 1 as a minimum unit are spatially arranged, and recognizes the light scattering characteristic for each large region consisting of a plurality of small regions. The small region may be referred to as one coordinate.

The three-dimensional data analysis unit 23 converts the light scattering characteristic of each region indicated by the three-dimensional data in accordance with the resolution of the 3D printer 1, and supplies the conversion result to the parameter calculation unit 24. For example, the three-dimensional data analysis unit 23 supplies the light scattering characteristic of each large region to the parameter calculation unit 24.

The parameter calculation unit 24 generates print data based on the light scattering characteristic for each large region, the first refractive index, and the second refractive index. The print data is used to form the layered resin structure 6 by the print head 2. The print data includes information indicating whether to discharge ink to each of a plurality of small regions (coordinates) that constitute the above-mentioned modeling range, and information indicating which of the first material and the second material is discharged when ink is discharged.

The parameter calculation unit 24 estimates a layered resin structure 6 for reproducing the light scattering characteristics indicated by the three-dimensional data based on the first refractive index and the second refractive index, and calculates, based on the estimated result, the mixing ratio of the second material to the first material. For example, the parameter calculation unit 24 calculates the mixing ratio of the second material to the first material for each large region. That is, the parameter calculation unit 24 calculates, as the mixing rate, the ratio of the granular portions formed from the second material with respect to the base portion formed from the first material. Specifically, when a resin structure corresponding to the plurality of small regions constituting the large region is formed, the parameter calculation unit 24 generates print data so that the mixing ratio, which is the ratio of the small region provided with the resin structure formed from the second material with respect to the small region provided with the resin structure formed from the first material in the large region, is a value corresponding to the light scattering characteristic of the large region.

The parameter calculation unit 24, for example, estimates a layered resin structure 6 for reproducing desired light scattering characteristics using Mie scattering theory, based on the light scattering characteristics of each large region, the first refractive index, and the second refractive index. That is, the parameter calculation unit 24 calculates the mixing ratio of the resin structure formed from the first material and the resin structure formed of the second material for reproducing the desired light scattering characteristic, and determines from which of the first material and the second material the resin structure corresponding to each small region, constituting the large region, is formed in accordance the calculated mixing ratio, thereby generating print data based on the determination result.

The parameter calculation unit 24 supplies, to the positioning mechanism drive circuit 25, a drive signal for driving the positioning mechanism 4 based on the print data generated as described above. The positioning mechanism drive circuit 25 drives the positioning mechanism 4 in accordance with the drive signal supplied from the parameter calculation unit 24, thereby moving the print head 2 in the X direction, the Y direction, or the Z direction. As a result, the parameter calculation unit 24 moves the print head 2 to a position corresponding to a specific coordinate in the print data.

In addition, the parameter calculation unit 24 supplies a drive signal for driving the print head 2 to the print head drive circuit 26 based on the print data generated as described above. The print head drive circuit 26 drives the print head 2 in accordance with the drive signal supplied from the parameter calculation unit 24, thereby the print head 2 discharges no droplets, discharges the first material, or discharges the second material.

As described above, the controller 5 of the 3D printer 1 generates the print data including at least the mixing ratio of the first material and the second material based on the three-dimensional data, the first refractive index, and the second refractive index. The controller 5 moves the print head 2 via the positioning mechanism 4 to a position corresponding to the specific coordinates of the print data. Furthermore, the controller 5 operates the print head 2 in accordance with the print data of the coordinates. As a result, the 3D printer 1 forms layers of a resin structure while switching the material to be discharged between the first material and the second material in accordance with the mixing ratio indicated by the print data. The 3D printer 1 repeats the step of forming layers of the resin structure, thereby forming the layered resin structure 6 as a body phantom.

Figure 4:
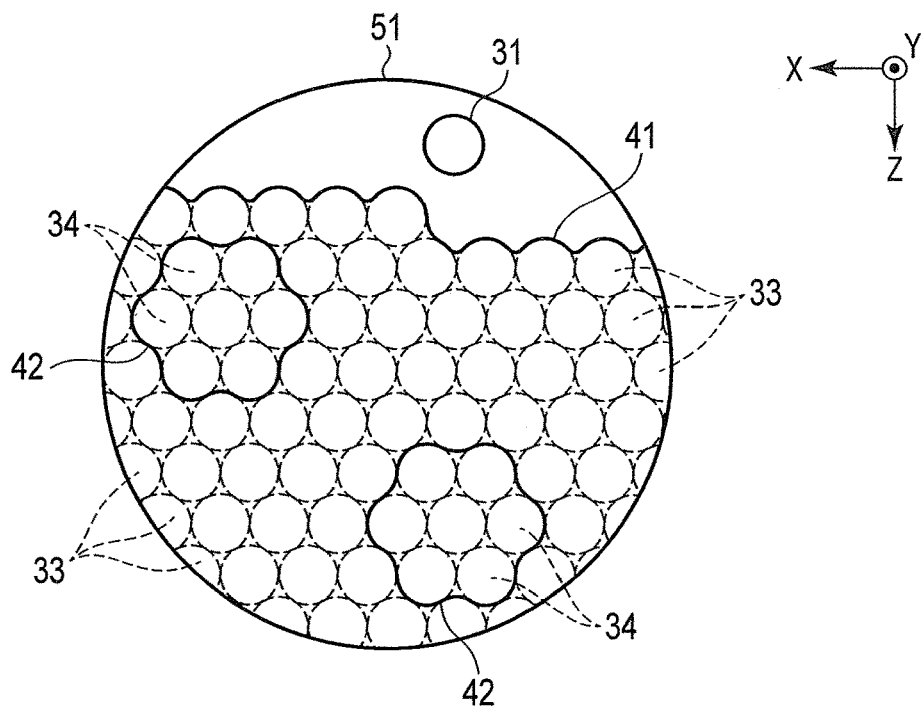
FIG. 4 is an enlarged view showing a structure within a part of a layered resin structure.

FIG. 4 is an enlarged view of the resin structure within a range 51 shown in FIG. 2. The circular dotted lines in FIG. 4 schematically show droplets. In practice, droplets are integrated with the resin structure at the landing position after landing and cured. The solid line in in FIG. 4 schematically shows the boundary between two or more types of materials having different refractive indices. Specifically, the solid line in FIG. 4 shows a boundary between air and a first resin structure 33 formed by curing droplets 31 of the first material, or a boundary between the first resin structure 33 and a second resin structure 34 formed by curing droplets 32 of the second material.

As shown in FIG. 4, the parameter calculation unit 24 of the controller 5 generates print data so that a plurality of second resin structures 34 are arranged at adjacent coordinates. The second resin structures 34 arranged adjacent are integrated with each other at the time of curing, thereby forming the granular portions 42.

The optical characteristics (for example, light scattering characteristics) within a predetermined region (large region) of the layered resin structure 6 are determined by a distribution concentration of the granular portions 42 with respect to the base portion 41 in the large region, the shape of the granular portions 42, the diameter of the granular portions 42, and the like. By forming the granular portions 42 in the base portion 41 in the mixing ratio corresponding to the optical characteristics indicated by the three-dimensional data, the 3D printer 1 can form a body phantom which is the layered resin structure 6 that simulates the optical characteristics of the living body used for generating the three-dimensional data. Thus, the 3D printer 1 can realize production of a body phantom accurately simulating a shape, function and characteristics of the living body, cost reduction in production of the body phantom, and improvement in the immediacy of production of the body phantom.

In order to prevent the granular portions 42 from being periodically arranged in the base portion 41, the parameter calculation unit 24 may arrange the granular portions 42 in a mixing ratio corresponding to the light scattering characteristics in the large region using a random number. By doing so, it is possible to prevent the light scattering characteristics of the layered resin structure 6 from being biased due to the periodicity of the granular portions 42 in the base portion 41.

Figure 5:
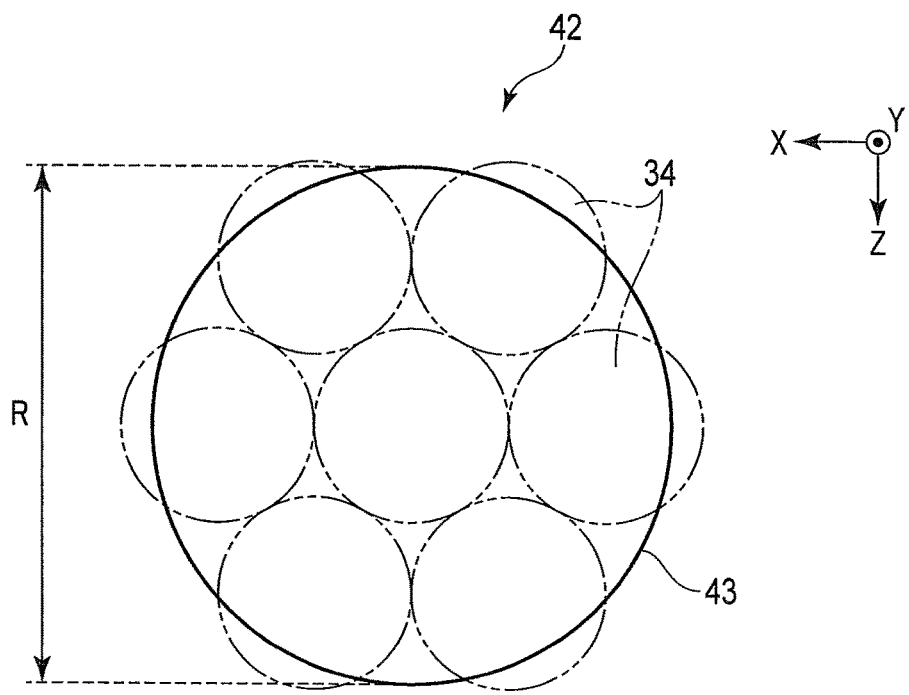
FIG. 5 is an explanatory diagram to explain granular portions.

FIG. 5 is an explanatory view of the granular portion 42. The granular portion 42 is formed in a spherical shape, but is actually not a sphere. Therefore, when the diameter of the granular portion 42 is defined, the diameter of a sphere 43 having a volume equivalent to that of the plurality of second resin structures 34 constituting the granular portion 42 is treated as a diameter R (equivalent diameter) of the granular portion 42. That is, the equivalent diameter indicates diameter of sphere having a volume equivalent to the granular portion 42.

For example, if the equivalent diameter R of the granular portion 42 is smaller than 0.5 μm, Rayleigh scattering may occur. For this reason, it becomes difficult to simulate optical characteristics of a living body mainly intended for scattering. In addition, the accuracy of the shape of the layered resin structure 6 decreases as the amount of droplets discharged increases. Therefore, when the equivalent diameter R of the granular portion 42 (or the diameter of the droplet 32) is larger than 90 μm, the accuracy of the shape of the layered resin structure 6 is lowered, and the possibility of clogging of the resin material at the nozzle of the printer head 2 increases. Thus, it is desirable that the equivalent diameter R of the granular portion 42 is within the range of 0.5 μm to 90 μm, and a diameter corresponding to the light scattering characteristics indicated by the three-dimensional data.

In addition, by increasing the difference in refractive index at the boundary between the second resin structure 34 and the first resin structure 33, the degrees of reflected light and diffused light generated between two types of materials can be increased. However, if the difference between the first refractive index of the first resin structure 33 and the second refractive index of the second resin structure 34 is small, the layered resin structure 6 may not have an optical characteristic equivalent to that of the living body. In order to obtain desired scattering characteristics, it is desirable that the difference between the first refractive index and the second refractive index is larger than a predetermined value. Specifically, it is desirable that the absolute value of the difference between the first refractive index of the first resin structure 33 and the second refractive index of the second resin structure 34 is greater than 0.2.

Figure 6:
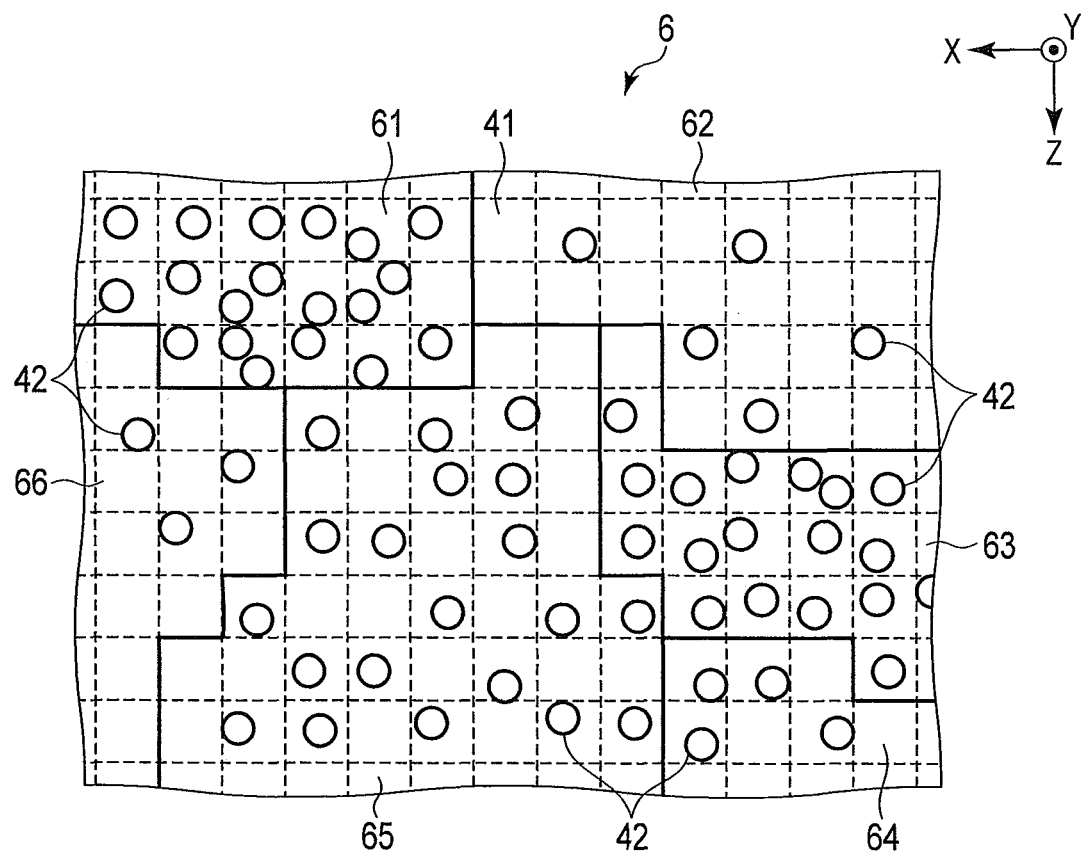
FIG. 6 shows an example of a layered resin structure having a plurality of large regions in which the mixing ratio of the second material to the first material is different.

FIG. 6 shows an example of the layered resin structure 6 having a plurality of large regions in which the mixing ratio of the second material to the first material is different. The dotted line in FIG. 6 schematically shows the boundary of the small regions. The solid line in FIG. 6 schematically shows the boundary of the large regions. As shown in FIG. 6, the layered resin structure 6 includes a first region 61, a second region 62, a third region 63, a fourth region 64, a fifth region 65, a sixth region 66, etc. The first region 61, the second region 62, the third region 63, the fourth region 64, the fifth region 65, and the sixth region 66 are large regions in which the mixing ratio of the second material with respect to the first material is different.

As described above, the three-dimensional data analysis unit 23 recognizes light scattering characteristics for each large region consisting of the plurality of small regions based on three-dimensional data. The parameter calculation unit 24 calculates the mixing ratio of the second material with respect to the first material for each large region in accordance with the light scattering characteristics of each large region, and generates the print data of each large region in accordance with the calculated mixing ratio. According to the configuration described above, the 3D printer 1 can produce the layered resin structure 6 in which the mixing ratio of the second material to the first material is partially different. As a result, the 3D printer 1 can produce a body phantom having partially different optical characteristics.

Second Embodiment

In the first embodiment, the second material is described as a resin material, but the present invention is not limited to this configuration. The second material may also be a gas.

Figure 7:
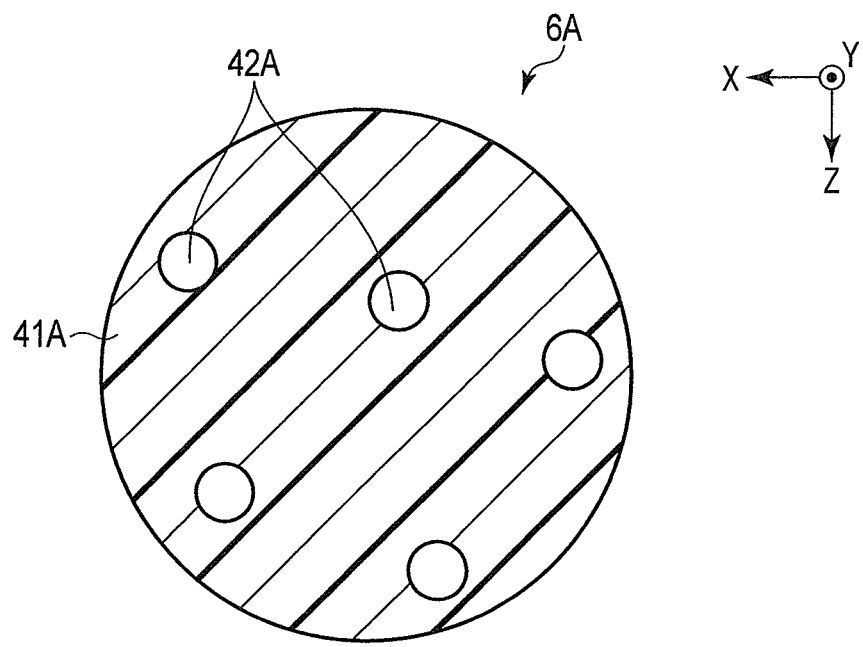
FIG. 7 is an explanatory diagram to explain a configuration example of a layered resin structure according to a second embodiment.

FIG. 7 is an explanatory diagram to explain a configuration example of a layered resin structure 6A according to the second embodiment. The layered resin structure 6A includes a base portion 41A formed from the first material, i.e., a resin, and granular portions 42A that are not filled with a resin but formed as gaps.

Also in this case, the 3D printer 1 can realize production of a body phantom accurately simulating a shape, function and characteristics of the living body, cost reduction in production of the body phantom, and improvement in the immediacy of production of the body phantom.

Third Embodiment

In the first embodiment, the granular portion 42 formed from the second resin structure 34 is described as spherical, but the present invention is not limited to this configuration. The granular portion 42 may be formed in an anisotropic shape.

Figure 8:
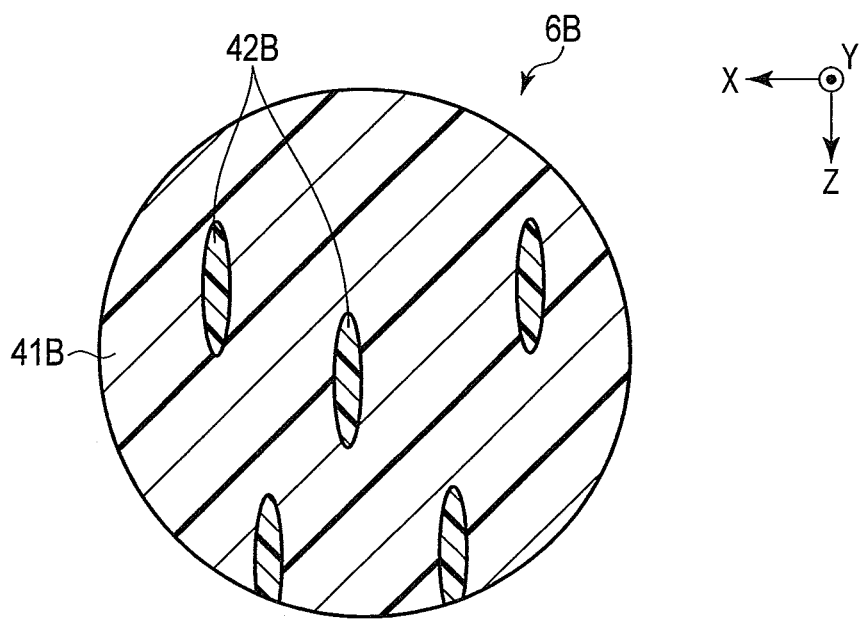
FIG. 8 is an explanatory diagram to explain a configuration example of a layered resin structure according to a third embodiment.

FIG. 8 is an explanatory diagram to explain a configuration example of a layered resin structure 6B according to the third embodiment. The layered resin structure 6B includes a base portion 41B formed from the first material, and granular portions 42B formed in an ellipsoidal shape from the second resin structure 34. For example, the granular portions 42B are arranged so that long axes of the ellipsoids are parallel within the same large region.

According to such a configuration, the 3D printer 1 can produce a body phantom having different light scattering characteristics depending on the direction of incidence of light.

Optical characteristics of the body phantoms produced according to the above-described embodiments are already found, and are therefore particularly useful for testing for performing calibration of, for example, medical devices.

In the above embodiments, the light scattering characteristic is used as an example of the optical characteristics indicated by the three-dimensional data, but the present invention is not limited to this. Examples of the optical characteristics include a light scattering characteristic, light absorption characteristic, spectral characteristic, transmission characteristic, reflection characteristic, and a combination thereof.

Described in the above embodiments is that the three-dimensional data has information indicating optical characteristics, and the 3D printer 1 forms a resin structure in accordance with the three-dimensional data, thereby producing a body phantom in which the optical characteristics indicated by the three-dimensional data are reproduced, but the present invention is not limited to this configuration. The characteristics indicated by the three-dimensional data are not limited to the optical characteristics, and may be any characteristic such as a spectral characteristic, acoustic characteristic, radiation characteristic, magnetic characteristic, or the like on the condition that it can be reproduced by a plurality of materials. The 3D printer 1 forms a resin structure from plural types of materials for reproducing characteristics indicated by the three-dimensional data in a mixing ratio, shape, etc. in accordance with characteristics, thereby producing a body phantom in which characteristics indicated by three-dimensional data are reproduced. In the above embodiment, a case where two types of materials are mixed has been described, but more types of materials may be mixed.

The present invention is not limited to the above-described embodiments and can be embodied in practice by modifying the structural elements without departing from the gist of the invention. In addition, various inventions can be made by suitably combining the structural elements disclosed in connection with the above embodiments. For example, some of the entire structural elements described in the embodiments may be omitted. In addition, the structural elements between different embodiments may be combined as appropriate.

The invention claimed is:

1. A body phantom comprising:
a layered resin structure,
wherein:
the layered resin structure is formed by combining a first material having a first refractive index and a second material having a second refractive index,
the layered resin structure comprises a plurality of granular portions, each of the plurality of granular portions being formed from the second material,
the plurality of granular portions have a three-dimensional distribution, the three-dimensional distribution corresponding to three-dimensional data of an optical characteristic of a living body,
a diameter of the plurality of granular portions differs among different regions of the three-dimensional distribution, the diameter of the plurality of granular portions in a given region of the three-dimensional distribution being set according to the optical characteristic in a corresponding region of the three-dimensional data, and
a mixing ratio of the second material to the first material to form the layered resin structure is a value that is set according to the optical characteristic of the living body.

2. The body phantom according to claim 1, wherein the diameter of the granular portions is 0.5 μm or more and less than 90 μm.

3. The body phantom according to claim 1, wherein the granular portions are formed in a spherical shape.

4. The body phantom according to claim 1 wherein the granular portions are formed in an ellipsoidal shape.

5. The body phantom according to claim 4, wherein the granular portions are arranged so that long axes of ellipsoids are parallel in a predetermined region.

6. The body phantom according to claim 1, wherein the granular portions are arranged non-periodically in the layered resin structure.

7. The body phantom according to claim 1, wherein an absolute value of a difference between the first refractive index and the second refractive index is 0.2 or more.

8. The body phantom according to claim 1, wherein the layered resin structure comprises a first region in which a mixing ratio of the second material to the first material is a first mixing ratio, and a second region in which a mixing ratio of the second material to the first material is a second mixing ratio.

* * * * *